(12) United States Patent
Goyal et al.

(10) Patent No.: US 10,144,000 B2
(45) Date of Patent: Dec. 4, 2018

(54) SULFUR RESISTANT NICKEL BASED CATALYSTS, METHODS OF FORMING AND USING SUCH CATALYSTS

(71) Applicant: Southern Research Institute, Birmingham, AL (US)

(72) Inventors: Amit Goyal, Durham, NC (US); Santosh Gangwal, Durham, NC (US); Andrew Lucero, Durham, NC (US)

(73) Assignee: Southern Research Institute, Birmingham, AL (US)

(*) Notice: Subject to any disclaimer, the term of this patent is extended or adjusted under 35 U.S.C. 154(b) by 40 days.

(21) Appl. No.: 15/175,817

(22) Filed: Jun. 7, 2016

(65) Prior Publication Data

US 2016/0367970 A1 Dec. 22, 2016

Related U.S. Application Data

(60) Provisional application No. 62/180,888, filed on Jun. 17, 2015, provisional application No. 62/252,804, filed on Nov. 9, 2015.

(51) Int. Cl.
*B01J 23/755* (2006.01)
*B01J 23/883* (2006.01)
(Continued)

(52) U.S. Cl.
CPC .............. *B01J 23/883* (2013.01); *B01J 7/02* (2013.01); *B01J 19/245* (2013.01); *B01J 23/755* (2013.01);
(Continued)

(58) Field of Classification Search
None
See application file for complete search history.

(56) References Cited

U.S. PATENT DOCUMENTS

| 3,368,982 A | 2/1968 | Milbourne |
| 3,791,993 A * | 2/1974 | Rostrup-Nielsen ...... B01J 23/74 423/654 |

(Continued)

OTHER PUBLICATIONS

Gama, L., et al., "Synthesis and Characterization of the NiAl2O4, CoAl2O4, and ZnAl2O4 Spinels by the Polymeric Precursors Method," Journal of Alloys and Compounds, vol. 483: 453-455 (2009).

(Continued)

Primary Examiner — Wayne A Langel
(74) Attorney, Agent, or Firm — Edel, Shapiro & Finnan, LLC

(57) ABSTRACT

Nickel based catalyst structures are described herein that include a plurality of metal oxides formed as crystalline phases within the catalyst structures. Each metal oxide of a catalyst structure includes nickel and/or aluminum, where one or more metal oxides includes a nickel aluminum oxide, and the one or more nickel aluminum oxides is greater than 50% by weight of the catalyst structure. The catalyst structures further have surface areas of at least 13 $m^2/g$. The catalyst structures are resistant to high concentrations of sulfur and are effective in reforming operations for converting methane and other light hydrocarbons to hydrogen and one or more other components. For example, the catalyst structures are effective in coal and biomass gasification systems for the forming and cleanup of synthetic gas.

18 Claims, 14 Drawing Sheets

(51) Int. Cl.
- *B01J 37/08* (2006.01)
- *B01J 35/00* (2006.01)
- *B01J 23/88* (2006.01)
- *B01J 35/10* (2006.01)
- *C01B 3/40* (2006.01)
- *B01J 7/02* (2006.01)
- *B01J 19/24* (2006.01)
- *B01J 37/04* (2006.01)
- *C01B 3/38* (2006.01)
- *C10G 5/00* (2006.01)
- *C10J 3/72* (2006.01)
- *C10K 1/00* (2006.01)
- *C10K 3/04* (2006.01)
- *C10G 2/00* (2006.01)
- *B01J 8/00* (2006.01)
- *C10J 3/00* (2006.01)
- *H01M 4/90* (2006.01)

(52) U.S. Cl.
CPC .......... *B01J 23/88* (2013.01); *B01J 35/0006* (2013.01); *B01J 35/1014* (2013.01); *B01J 37/04* (2013.01); *B01J 37/088* (2013.01); *C01B 3/382* (2013.01); *C01B 3/40* (2013.01); *C10G 2/30* (2013.01); *C10G 5/00* (2013.01); *C10J 3/72* (2013.01); *C10K 1/004* (2013.01); *C10K 1/005* (2013.01); *C10K 3/04* (2013.01); *B01J 8/0005* (2013.01); *B01J 35/1038* (2013.01); *B01J 35/1061* (2013.01); *B01J 2219/00* (2013.01); *B01J 2219/00033* (2013.01); *B01J 2219/24* (2013.01); *B01J 2523/00* (2013.01); *C01B 2203/025* (2013.01); *C01B 2203/0233* (2013.01); *C01B 2203/0244* (2013.01); *C01B 2203/0485* (2013.01); *C01B 2203/062* (2013.01); *C01B 2203/066* (2013.01); *C01B 2203/1058* (2013.01); *C01B 2203/1088* (2013.01); *C01B 2203/1241* (2013.01); *C01B 2203/141* (2013.01); *C10J 3/00* (2013.01); *C10J 2300/093* (2013.01); *C10J 2300/0913* (2013.01); *C10J 2300/0916* (2013.01); *C10J 2300/0956* (2013.01); *C10J 2300/0959* (2013.01); *C10J 2300/0976* (2013.01); *C10J 2300/1618* (2013.01); *C10J 2300/1659* (2013.01); *H01M 4/9025* (2013.01); *Y02E 20/18* (2013.01); *Y02P 20/52* (2015.11)

(56) References Cited

U.S. PATENT DOCUMENTS

| | | | |
|---|---|---|---|
| 4,060,498 A | 11/1977 | Kawagoshi et al. | |
| 4,132,672 A | 1/1979 | Wise et al. | |
| 4,151,191 A | 4/1979 | Happel et al. | |
| 4,233,179 A | 11/1980 | Russ et al. | |
| 4,456,703 A | 6/1984 | Aldridge | |
| 5,169,813 A | 12/1992 | Miller et al. | |
| 5,358,631 A | 10/1994 | Miller et al. | |
| 5,399,537 A * | 3/1995 | Bhattacharyya | B01J 23/005 423/592.1 |
| 5,478,791 A * | 12/1995 | Baldauf | B01J 23/755 502/325 |
| 5,939,353 A | 8/1999 | Bhattacharyya et al. | |
| 6,063,723 A | 5/2000 | Miller | |
| 6,238,816 B1 | 5/2001 | Cable et al. | |
| 6,953,488 B2 | 10/2005 | Bhattacharyya et al. | |
| 7,592,290 B2 | 9/2009 | Hussain et al. | |
| 7,771,702 B2 | 8/2010 | Eyman et al. | |
| 7,777,586 B2 | 8/2010 | Wang et al. | |
| 7,901,565 B2 | 3/2011 | Giroux et al. | |
| 7,901,566 B2 | 3/2011 | Giroux et al. | |
| 8,575,063 B2 * | 11/2013 | Xu | B01J 23/755 502/335 |
| 2008/0224097 A1 | 9/2008 | Fujie et al. | |
| 2010/0304236 A1 * | 12/2010 | Ying | B01J 23/002 429/423 |
| 2012/0063963 A1 * | 3/2012 | Watanabe | B01J 23/755 422/149 |
| 2017/0333875 A1 * | 11/2017 | Ratnasamy | B01J 21/04 |

OTHER PUBLICATIONS

López-Fonseca, R., et al., "Partial Oxidation of Methane to Syngas on Bulk NiAl2O4 Catalyst. Comparison with Alumina Supported Nickel, Platinum and Rhodium Catalysts," Applied Catalysis A: General, vols. 437-438 : 53-62 (2012).
Sahlii, N., et al., "Ni Catalysts from NiAl2O4 Spinel for CO2 Reforming of Methane," Catalysis Today, vol. 113: 187-193 (2006).
Salhi, N., et al., "Steam Reforming of Methane on Nickel Aluminate Defined Structures with High Al/Ni Ratio," Studies in Surface Science and Catalysis, vol. 174: 1335-1338 (2008).
European Search Report (19 pages) in corresponding European Patent Application No. 16174701.9, dated Sep. 29, 2016.
Cheekatamarla et al., "Poisoning effect of thiophene on the catalytic activity of molybdenum carbide during tri-methyl pentane reforming for hydrogen generation", Applied Catalysis A: general 287 (2005), pp. 176-182.
Cheekatamarla et al., "Catalytic activity of molybdenum carbide for hydrogen generation via diesel reforming", Journal of Power Sources 158 (2006) pp. 477-484.
Morris et al., "Ordered Mesoporous Alumina-Supported Metal Oxides", JACS Articles, American Chemical Society 2008, pp. 15210-15216.
Wang et al., "Development of novel highly active and sulphur-tolerant catalysts for steam reforming of liquid hydrocarbons to produce hydrogen", Applied Catalysis A: General 257 (2004), pp. 43-47.
Xie et al., "Sulfur poisoning of CeO2—Al2O3-supported mono- and bi-metallic Ni and Rh catalysts in steam reforming of liquid hydrocarbons at low and high temperatures", Applied Catalysis A: general 390 (2010) pp. 210-218.
Komeili, S., et al., "The Properties of Nickel Aluminate Nanoparticles Prepared by Sol-Gel and Impregnation Methods," Res. Chem. Intermed., vol. 42(12): 7909-7921 (2016).
Office Action (11 pages) in corresponding European Patent Application No. 16174701.9, dated Dec. 12, 2017.

* cited by examiner

US 10,144,000 B2

SULFUR RESISTANT NICKEL BASED CATALYSTS, METHODS OF FORMING AND USING SUCH CATALYSTS

CROSS-REFERENCE TO RELATED APPLICATION

This application claims priority from U.S. Provisional Patent Application Ser. No. 62/180,888, entitled "Sulfur Resistant Catalysts", filed Jun. 17, 2015, and from U.S. Provisional Patent Application Ser. No. 62/252,804, entitled "Sulfur Resistant Catalysts", filed Nov. 9, 2015. The disclosures of both of these provisional patent applications are incorporated herein by reference in their entireties.

GOVERNMENT LICENSE RIGHTS

This invention was made with government support under contract number DE-FE0012054 awarded by the Department of Energy—National Energy Technology Laboratory. The government may have certain rights in the invention.

FIELD OF THE INVENTION

The present invention relates to nickel based catalysts that are resistant to deactivation by sulfur, particularly for use in reforming processes for conversion of light hydrocarbons and tars as well as decomposition of ammonia (e.g., in operations for producing and/or cleanup of synthetic gas).

BACKGROUND

Steam reforming is a widely used method for production of hydrogen. Steam reforming can be utilized, for example, in applications such as synthetic gas (syngas) production and cleanup of the syngas. Syngas can be produced, for example, from a solid hydrocarbon material such as coal or biomass via gasification processes in which steam is combined with oxygen to convert the solid hydrocarbon material into its gaseous derivative components, including hydrogen ($H_2$), carbon monoxide (CO), carbon dioxide ($CO_2$), water ($H_2O$), methane ($CH_4$) as well as tar and other light hydrocarbons. A significant and expensive challenge during coal or biomass gasification is cleanup of the raw syngas, in which certain gaseous components (e.g., methane and tar) are reformed and other contaminants (e.g., ammonia, hydrochloric acid, sulfur, mercury and other heavy metals) are removed. In addition, depending upon the application of the syngas, the syngas may further need to be conditioned to adjust the hydrogen-to-carbon monoxide ratio in order to meet downstream process requirements. Steam reforming can be utilized in the coal gasification process to convert light hydrocarbon species such as methane to hydrogen and one or more other components (e.g., carbon monoxide).

In a steam reforming process, methane and/or other light hydrocarbons are contacted with an oxidant such as steam ($H_2O$) at an elevated temperature to produce a mixture of carbon monoxide and hydrogen. The formed carbon monoxide can then be reacted with steam at relatively lower temperature to produce carbon dioxide and hydrogen. A methane reforming reaction is highly endothermic and thus requires high energy input to break the C—H bond in methane. The required heat energy input can be provided by indirect heat exchange using an external heat source (e.g., a burner or firebox).

Reforming can also be performed in two direct heating configurations, namely, partial oxidation and auto thermal reforming. In partial oxidation, instead of using steam, methane is oxidized by reacting with oxygen to form carbon monoxide and hydrogen. This reaction is exothermic. In an auto thermal reforming reaction, both steam and oxygen are used as oxidizing agents (with no external heat being required). The endothermic heat for steam reforming is provided by oxidation and partial oxidation reactions.

Nickel based catalysts that are typically used in reforming operations include nickel metal dispersed on refractory oxides such as α-alumina and $MgAl_2O_4$. However, the use of such catalysts face several challenges, such as activity loss due to coking, thermal sintering, sulfur poisoning and metal sintering due to sulfur attack. Sulfur contaminants present in hydrocarbon streams are present as or are converted to hydrogen sulfide ($H_2S$) during high temperature reforming. Sulfur can also be present in other forms, such as mercaptans and thiophenes, and all of these forms of sulfur can poison the nickel based catalyst. In particular, conventional nickel oxide catalysts undergo rapid deactivation in the presence of sulfur, resulting in unacceptably low levels of methane and/or hydrocarbon conversion during the reforming process.

In an effort to achieve greater sulfur tolerance for the catalyst during reforming applications, two known approaches have been considered: use of noble metals in the catalyst which show low equilibrium concentration with sulfur at varied temperature ranges; and use of nickel based catalysts with dopants to increase sulfur tolerance (this approach has largely met with failure). Platinum and other noble metal catalysts show high activity in reforming processes. However, the rate of deactivation caused by sulfur for noble metal based catalysts is still unacceptably high. In addition, noble metal catalysts tend to be too expensive for use in large scale reforming applications. The nickel based catalysts with dopants are also deactivated in the presence of high sulfur concentrations. Thus, no known catalysts in use and in literature studies appear operable for sustained time periods (e.g., 8 hours or more) in the presence of $H_2S$ concentrations greater than 100 ppm.

It would be desirable to provide nickel based catalysts for a steam reforming process that facilitate high temperature conversion of methane, tars and other light hydrocarbon species in the presence of contaminants such as $H_2S$ and over extended time periods, where $H_2S$ is present at concentrations greater than 100 ppm.

SUMMARY OF THE INVENTION

In example embodiments, a catalyst structure comprises a plurality of metal oxides formed as crystalline phases within the catalyst structure. Each metal oxide comprises nickel and/or aluminum, where one or more metal oxides comprises a nickel aluminum oxide, and the one or more nickel aluminum oxides is greater than 50% by weight of the catalyst structure. The catalyst structure further has a surface area of at least 13 $m^2/g$.

The catalyst structures described herein are resistant to high concentrations of sulfur and are effective in reforming operations for converting methane and other light hydrocarbons to hydrogen and one or more other components. For example, the catalyst structures are effective in coal and biomass gasification systems for the forming and cleanup of synthetic gas.

In other example embodiments, methods of forming catalyst structures as described herein include combining metals comprising nickel and aluminum dissolved in one or more solvents to form a mixed solution, drying the mixed solution to evaporate the one or more solvents to form a solid material, and calcining the solid material to form the catalyst structure. The calcining process comprises heating the solid material at a plurality of increasing set temperatures until reaching a final set temperature of at least about 1000° C., where the solid material is heated at a selected heating rate from each set temperature to a successive set temperature until the final set temperature is achieved, and the solid material is held at each set temperature for a selected time period.

In further example embodiments, methods and systems for utilizing the catalyst structures of the invention are described, in which a system comprises a reformer including one or more catalysts of the types described herein disposed within the reformer, where the reformer is configured to receive an input gas stream comprising methane and $H_2S$ at a concentration of at least about 35 ppm and convert the input gas stream to form an output gas stream such that 70% of the methane present in the input gas stream is converted in the output gas stream to hydrogen and one or more other components.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE DRAWINGS

Like reference numerals have been used to identify like elements throughout this disclosure.

DETAILED DESCRIPTION

Figure 1:
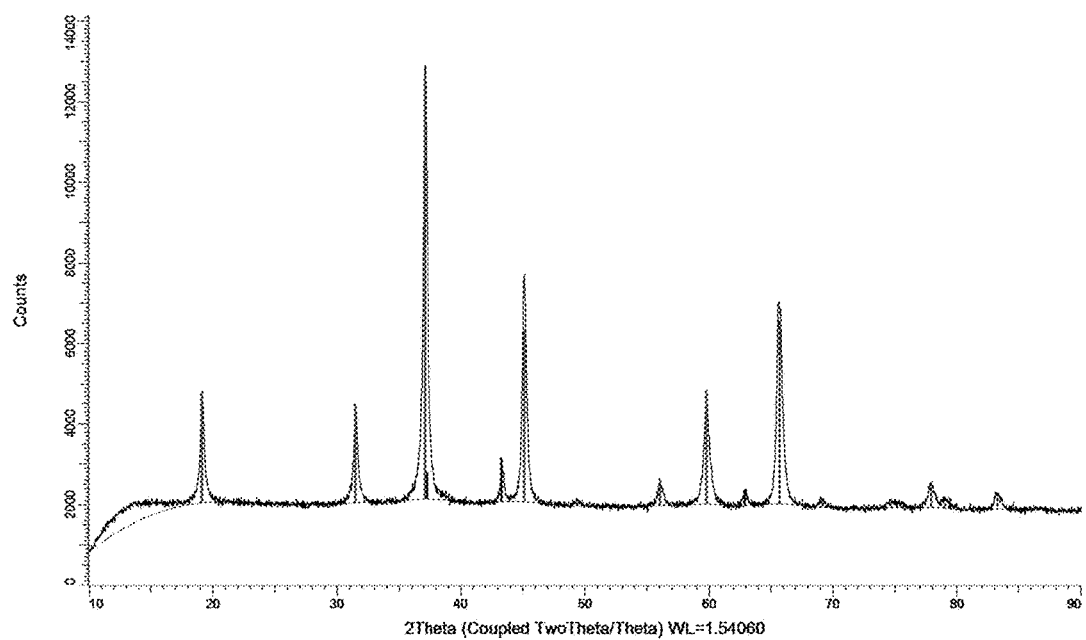
FIG. 1 is a plot of a wide angle X-ray diffraction (XRD) pattern of a nickel based catalyst (catalyst 1) formed in accordance with an example embodiment of the present invention.

In accordance with the present invention, nickel based catalyst structures are described herein which are highly resistant to deactivation by sulfur (e.g., $H_2S$). The sulfur resistant nickel based catalyst structures as described herein are particularly useful in reforming operations (e.g., steam reforming) of hydrocarbon species including methane and other light hydrocarbons and tars in the presence of sulfur and other contaminants (e.g., HCl) for the production of hydrogen. For example, the sulfur resistant nickel based catalyst structures can be utilized in a reforming process implemented in the production and/or cleanup of syngas so as to increase the amount of hydrogen ($H_2$) and carbon monoxide (CO) and/or the $H_2$:CO ratio in the syngas. The nickel based catalyst structures as described herein are particularly effective for use in reforming operations and over extended time periods (e.g., continuous operation of the reformer of about 8 hours or longer) in which the sulfur content (e.g., in the form of $H_2S$) is present in amounts of at least about 35 ppm, or at least about 90 ppm, or about 100 ppm or greater. For example, nickel based catalyst structures as described herein are effective for extended time periods in reforming operations in which sulfur concentrations are as high as about 250 ppm or greater, and even as high as about 500 ppm. The nickel based catalyst structures are further effective at such sulfur concentrations and at elevated temperatures of about 900° C. to about 1000° C.

The sulfur resistant nickel based catalyst structures as described herein comprise a plurality of different crystalline phases, where each phase comprises crystallites of a metal oxide that comprises nickel or aluminum. In some embodiments, the nickel based catalyst structures further comprise molybdenum. The nickel based catalyst structures further include one or more oxides that comprise alloys including both nickel and aluminum (also referred to herein as a nickel aluminum oxide). The one or more nickel aluminum oxides are present in each nickel based catalyst structure in an amount greater than 50% by weight of the nickel based catalyst structure.

In example embodiments, the nickel based catalyst structures can be generally described as comprising compositions having the following general formula: $Ni_aAl_bMo_cO_d$, where each of the values a, b, c and d represents the number of moles of each element per mole of the catalyst and each value can further vary over a selected range. In particular, the selected range for the values a, b, c and d can vary such that the nickel based catalyst structures consist essentially of following molar percentages (mol %) for each element: about 5-50 mol % (e.g., about 8-43 mol %) of nickel, about 10-50 mol % (e.g., about 16-47 mol %) of aluminum, about 0-5 mol % (e.g., about 0-1 mol %) of molybdenum, and about 25-75 mol % (e.g., about 28-75 mol %) of oxygen.

As a result of the manner in which the nickel based catalyst structures of the present invention are formed (as described in further detail herein), the structures have surface areas much larger than conventional nickel catalysts, where the surface area of the nickel based catalysts structures of the invention can be about 2 times greater than conventional nickel catalysts and can range from about 13 $m^2$/gram to about 35 $m^2$/gram or even greater (e.g., about 50 $m^2$/gram or larger, as large as about 65 $m^2$/g or even larger). The methods of forming the structures further result in the nickel based catalyst structures including different crystalline structural phases which, as previously, noted, include at least one crystalline structural phase including an alloy of nickel and aluminum, where aluminum within the alloy serves to protect nickel from being poisoned by sulfur so as to ensure the catalysts structures remain active even with exposure to high concentrations of sulfur.

The sulfur resistant nickel based catalyst structures as described herein are useful in reforming processes such as in hydrogen production for steam reforming of hydrocarbons, in autothermal reforming for fuel cell applications, as a solid oxide fuel cell anode catalyst and in syngas upgrading or cleanup following coal or biomass gasification. For example, the nickel based catalyst structures are particularly effective in reforming operations for syngas cleanup, in which light hydrocarbons (e.g., methane, ethane, propane, etc.) and tars are converted into $H_2$ and one or more other components (e.g., carbon monoxide, with the further potential for increasing $H_2$:CO ratio in the syngas). In addition, any ammonia that is present can also be converted into hydrogen and nitrogen.

In an example embodiment, the sulfur resistant nickel based catalyst structures can be implemented in reforming operations associated with a solid hydrocarbon (e.g., coal or biomass) gasification process that forms a syngas comprising $H_2$ and CO, such as in reforming operations for conversion of coal into high hydrogen content syngas for integrated gasification combined cycle (IGCC) and coal to liquids (CTL) applications. Since the costs associated with syngas cleanup (including conversion of methane and other light hydrocarbons and tars, decomposition of ammonia and removal of contaminants such as sulfur, HCl and certain metals) can be significant, a reforming process with effective catalysts such as those described herein can enhance the production and economic efficiencies of the syngas production and cleanup process.

Nickel based catalyst structures are formed via a suitable process that results in the formation of a polycrystalline or multicrystalline structure including a plurality of crystallite phases in which at least one phase comprises a nickel aluminum oxide. The formation of such crystallite phases, and in particular the nickel aluminum oxide phase, facilitates an active catalytic site of nickel/nickel oxide for the reforming process that is protected by aluminum oxide from being poisoned by sulfur within the process. In other words, aluminum is preferential to nickel for reduction by sulfur, thus protecting NiO from reduction to NiS so as to preserve nickel as an active catalytic site for prolonged periods of time and at higher concentrations of sulfur within the reformer than are conventionally allowed (e.g., at concentrations of $H_2S$ of about 35 ppm or greater, such as at about 90 ppm or greater or even at about 100 ppm or greater). In certain embodiments, molybdenum is also provided within the structures to further enhance the degree of sulfur resistance of the catalyst.

As previously noted, the nickel based catalyst structures can further be formed such that a majority of the multicrystalline structure comprises one or more nickel aluminum oxides. For example, in some embodiments, the amount of nickel aluminum oxide(s) forming the catalyst structure is greater than about 50% by weight of the catalyst structure. In certain example embodiments, the amount of nickel aluminum oxide(s) forming the catalyst structure can be as much as about 95% by weight of the catalyst structure or greater. The process also is configured to produce the catalyst structures having surface areas that are significantly larger than catalyst structures known in the art.

The sulfur resistant nickel based catalyst structures are formed by providing appropriate starting/reactant materials in combination with utilizing suitable calcining and drying methods during the formation process to achieve the different crystallite phases within the structures (including a majority of crystallites that are one or more types of nickel aluminum oxides) as well as large surface areas that serve as effective sites for catalytic activity and for high conversion of light hydrocarbons, tars and ammonia during reforming of syngas.

A process for forming nickel based catalyst structures having the general formula $Ni_aAl_bMo_cO_d$ in accordance with the invention includes the following steps generally described as follows:

1. Combining a source of each metal (e.g., Ni, Al and optionally Mo) with a suitable solvent such that the metal is dissolved in solution. Each source of metal can be combined in a suitable solvent that renders the metal available for combining with other metals to form the metal oxide crystallites of the final product. For example, the source of nickel may be provided as nickel nitrate (e.g., in a hydrate form, such as nickel (II) nitrate hexahydrate) that is combined with a suitable polymer matrix (e.g., a block copolymer of glycols, such as polyethylene glycol and polypropylene glycol) and dissolved within one or more suitable solvents (e.g., ethanol or isopropanol). The source of aluminum may be provided in the form of an alkoxide (e.g., aluminum isopropoxide) that is dissolved in one or more suitable solvents (e.g., ethanol and/or a suitable acid such as nitric acid). In embodiments in which molybdenum is provided in the catalyst structure, the source of molybdenum may also be provided in the form of an alkoxide (e.g., molybdenum isopropoxide) dissolved in one or more suitable solvents (e.g., ethanol and/or a suitable acid such as nitric acid). The metal components are dissolved in separate solvent solutions. However, in alternative embodiments, any two or more metal components can be dissolved together within the same solvent solution. The combination and dissolution of each metal component within a solvent solution can be achieved by stirring the contents in solution at about ambient temperature and stirred for a sufficient period of time (e.g., about 4 hours to about 24 hours).

2. Combining the solutions containing the different metals within a single solution and sufficiently mixing for a suitable time period and at a suitable temperature. After each metal component has been sufficiently dissolved within its solvent, the solutions containing each metal component are combined and sufficiently mixed within a single solution for a sufficient period of time (e.g., about 5 hours to about 80 hours) and about ambient temperature (e.g., at about 20° C. to about 25° C.).

3. Drying the solution over a sufficient time period and a suitable temperature to adequately evaporate some or all of the solvent, resulting in a solid sample used to form the catalyst structure. The mixing of the solution continues while also drying to evaporate the solvent, thus forming a solid sample containing the metals. The mixing/drying step can be achieved by mixing at a temperature of about 50° C. to about 70° C. for a sufficient time period that evaporates some or all of the solvent (e.g., a period of about 4 days to about 20 days).

4. Calcining the sample at one or more sufficient temperatures and over selected time periods, resulting in the final catalyst structure at the end of the calcination process. The resultant dried sample is then calcined in a high temperature furnace at temperatures of at least about 1000° C., where the sample is heated to increasing set temperatures in a stepped manner and held at each increasing and successive set temperature for a sufficient or selected time period (e.g., from about 30 minutes to about 2 hours). In addition, the sample is heated within the furnace at a gradual, selected rate (e.g., from about 1° C./min to about 5° C./min) between each set temperature. This results in a long, sustained calcining process that can last at least about 10 hours.

An example calcining procedure that has been found useful for forming nickel based catalyst structures as described herein is defined by the series of steps provided in the following Table 1:

TABLE 1

Calcining Procedure

| Temperature | Holding time period | Heating rate (from current temperature to next/stepped temperature) |
|---|---|---|
| Ambient (about 20° C. to about 25° C.) | N/A | 1° C./min |
| 110° C. | 1 hour | 1° C./min |
| 400° C. | 1 hour | 5° C./min |
| 1100° C. | 1 hour | N/A |

The combination of the slow drying process (step 3, e.g., as much as about 20 days) and the calcination process (step 4) results in the formation of a nickel based catalyst structure that is multicrystalline, a majority (e.g., greater than 50% by weight of the catalyst structure) of which includes one or more crystallite phases that comprise a nickel aluminum oxide. The combined slow drying and calcination processes further yield catalysts structures including surface areas that are much larger in relation to conventional nickel based catalysts. For example, where the surface area of the nickel based catalysts structures of the invention can range from about 13 m$^2$/gram to about 35 m$^2$/gram or even greater.

The following are non-limiting examples of nickel based catalyst structures in accordance with the present invention that are formed using methods as described herein.

Example 1—Formation of a Catalyst Structure Having the General Formula $NiAl_2O_4$ (Catalyst 1)

A nickel solution was prepared as follows. About 23.9 g of a PEG-PPG-PEG triblock copolymer ((EO)20(PO)70(EO)20, obtained from Sigma-Aldrich, product number 435465) was dissolved in 240 ml of anhydrous ethanol (obtained from Fisher Scientific, product number A405P-4). About 34.9 g of nickel nitrate hexahydrate (obtained from Sigma-Aldrich, product number 244074) was added to the triblock copolymer solution and stirred for about 11 hours.

An aluminum solution was prepared as follows. About 49.0 g aluminum isopropoxide (obtained from Sigma-Aldrich, product number 220418) was dissolved in 46.1 ml of nitric acid (obtained from Sigma-Aldrich, product number 438073) and 120 ml of anhydrous ethanol and stirred for about 10 hours.

Once dissolved, the two solutions were combined and 40 mL of anhydrous ethanol was used to thoroughly transfer the aluminum isopropoxide solution. The combined solution was continuously stirred for about 8 hours. Drying and solvent evaporation was performed at about 60° C. with stirring (60 rpm) for about 15 days to form a dried sample.

The dried sample was calcined from ambient temperature to about 1100° C. in a high temperature furnace with a heating program as set forth in Table 1.

X-ray diffraction (XRD) analysis and BET surface area characterization was performed on the resultant catalyst structure and is described below with reference to FIG. 1 and Table 2. The resultant catalyst formed has an overall formula of $NiAl_2O_4$ with distinct crystalline phases, a majority of which is made up of a nickel aluminum oxide having the formula $NiAl_2O_4$.

Example 2—Formation of a Catalyst Structure Having the General Formula $NiAl_{10}O_{16}$ (Catalyst 2)

A nickel solution was prepared as follows. About 32.9 g of a PEG-PPG-PEG triblock copolymer ((EO)20(PO)70(EO)20, obtained from Sigma-Aldrich, product number 435465) was dissolved in 327 ml of anhydrous ethanol (obtained from Fisher Scientific, product number A405P-4). About 9.5 g of nickel nitrate hexahydrate (obtained from Sigma-Aldrich, product number 244074) was added to the triblock copolymer solution and stirred for about 21 hours.

An aluminum solution was prepared as follows. About 66.8 g aluminum isopropoxide (obtained from Sigma-Aldrich, product number 220418) was dissolved in 64 ml of nitric acid (obtained from Sigma-Aldrich, product number 438073) and 164 ml of anhydrous ethanol and stirred for about 20 hours.

Once dissolved, the two solutions were combined and 100 mL of anhydrous ethanol was used to thoroughly transfer the aluminum isopropoxide solution. The combined solution was continuously stirred for about 72 hours. Drying and solvent evaporation was performed at about 60° C. with stirring (60 rpm) for about 11 days to form a dried sample.

The dried sample was calcined from ambient temperature to about 1100° C. in a high temperature furnace with a heating program as set forth in Table 1.

Figure 2:
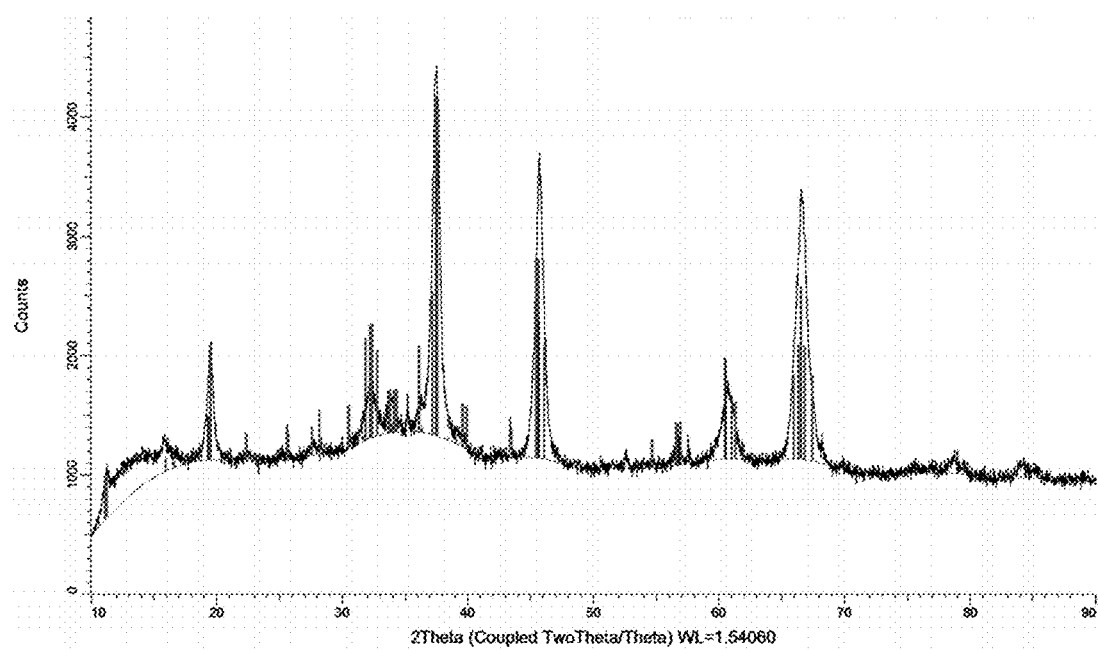
FIG. 2 is a plot of a wide angle X-ray diffraction (XRD) pattern of another nickel based catalyst (catalyst 2) formed in accordance with an example embodiment of the present invention.

X-ray diffraction (XRD) analysis and BET surface area characterization was performed on the resultant catalyst structure and is described below with reference to FIG. 2 and Table 2. The resultant catalyst formed has an overall formula of $NiAl_{10}O_{16}$ with distinct crystalline phases, a majority of which is made up of a nickel aluminum oxide having the formula $NiAl_{10}O_{16}$.

Example 3—Formation of a Catalyst Structure Having the General Formula $Ni_2Al_3O_5$ (Catalyst 3)

A nickel solution was prepared as follows. About 10.3 g of a PEG-PPG-PEG triblock copolymer ((EO)20(PO)70(EO)20, obtained from Sigma-Aldrich, product number 435465) was dissolved in 100 ml of anhydrous ethanol (obtained from Fisher Scientific, product number A405P-4). About 20 g of nickel nitrate hexahydrate (obtained from Sigma-Aldrich, product number 244074) was added to the triblock copolymer solution and stirred for about 4 hours.

An aluminum solution was prepared as follows. About 21.1 g aluminum isopropoxide (obtained from Sigma-Aldrich, product number 220418) was dissolved in 20 ml of nitric acid (obtained from Sigma-Aldrich, product number 438073) and 52 ml of anhydrous ethanol and stirred for about 4 hours.

Once dissolved, the two solutions were combined and 100 mL of anhydrous ethanol was used to thoroughly transfer the aluminum isopropoxide solution. The combined solution was continuously stirred for about 67 hours. Drying and solvent evaporation was performed at about 60° C. with stirring (60 rpm) for about 16 days to form a dried sample.

The dried sample was calcined from ambient temperature to about 1100° C. in a high temperature furnace with a heating program as set forth in Table 1.

Figure 3:
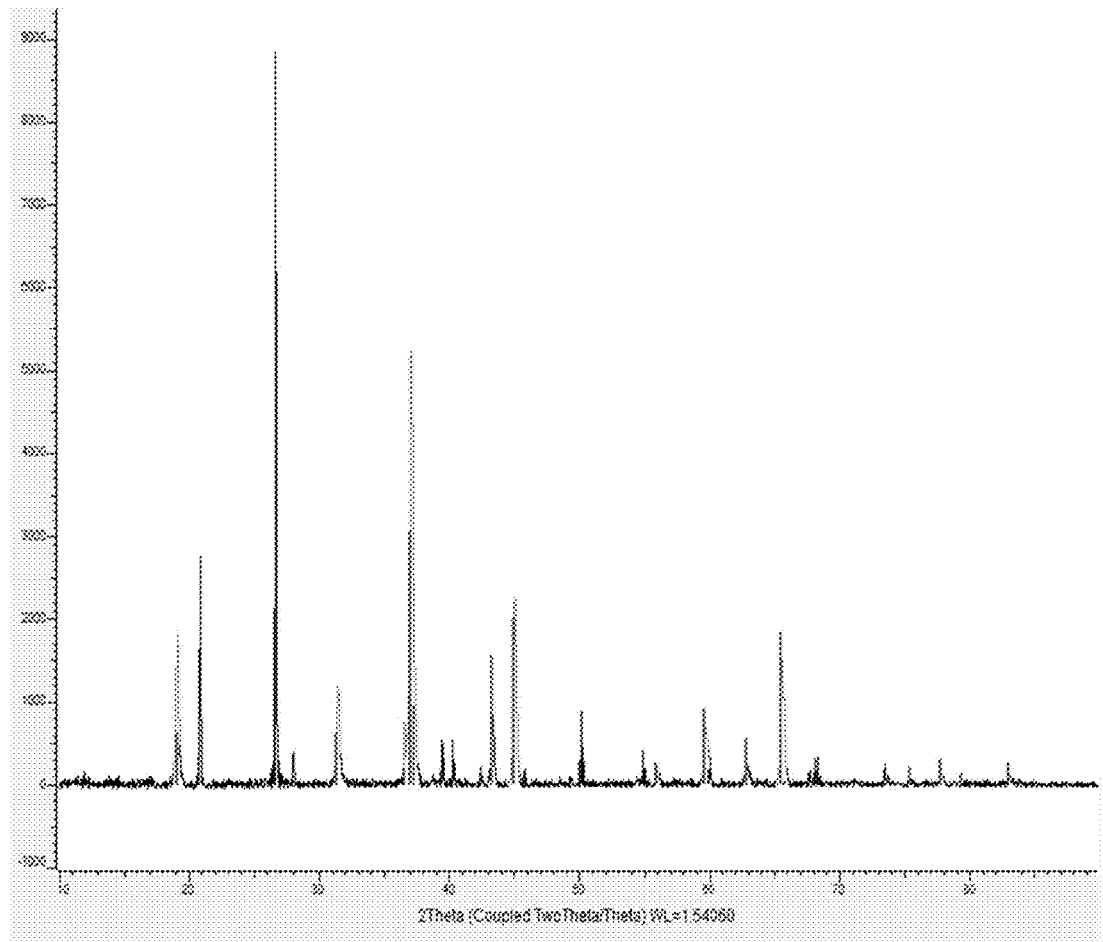
FIG. 3 is a plot of a wide angle X-ray diffraction (XRD) pattern of another nickel based catalyst (catalyst 3) formed in accordance with an example embodiment of the present invention.

X-ray diffraction (XRD) analysis and BET surface area characterization was performed on the resultant catalyst structure and is described below with reference to FIG. 3 and Table 2. The resultant catalyst formed has an overall formula of $Ni_2Al_3O_5$ with distinct crystalline phases, a majority of which is made up of a nickel aluminum oxide having the formula $NiAl_2O_4$.

Example 4—Formation of a Catalyst Structure Having the General Formula $NiAl_{10}O_{16}$ (Catalyst 4)

A nickel solution was prepared as follows. About 24 g of a PEG-PPG-PEG triblock copolymer ((EO)20(PO)70(EO)20, obtained from Sigma-Aldrich, product number 435465) was dissolved in 240 ml of anhydrous ethanol (obtained from Fisher Scientific, product number A405P-4). About 35 g of nickel nitrate hexahydrate (obtained from Sigma-Aldrich, product number 244074) was added to the triblock copolymer solution and stirred for about 4 hours.

An aluminum solution was prepared as follows. About 49 g aluminum isopropoxide (obtained from Sigma-Aldrich, product number 220418) was dissolved in 240 ml and stirred for about 8 hours.

A molybdenum solution was prepared as follows. About 5 grams of molybdenum isopropoxide solution is added to 100 ml of isopropanol.

Once dissolved, the solutions were combined. The combined solution was continuously stirred for about 67 hours. Drying and solvent evaporation was performed at about 60° C. with stirring (60 rpm) for about 16 days to form a dried sample.

The dried sample was calcined from ambient temperature to about 1100° C. in a high temperature furnace with a heating program as set forth in Table 1.

Figure 4:
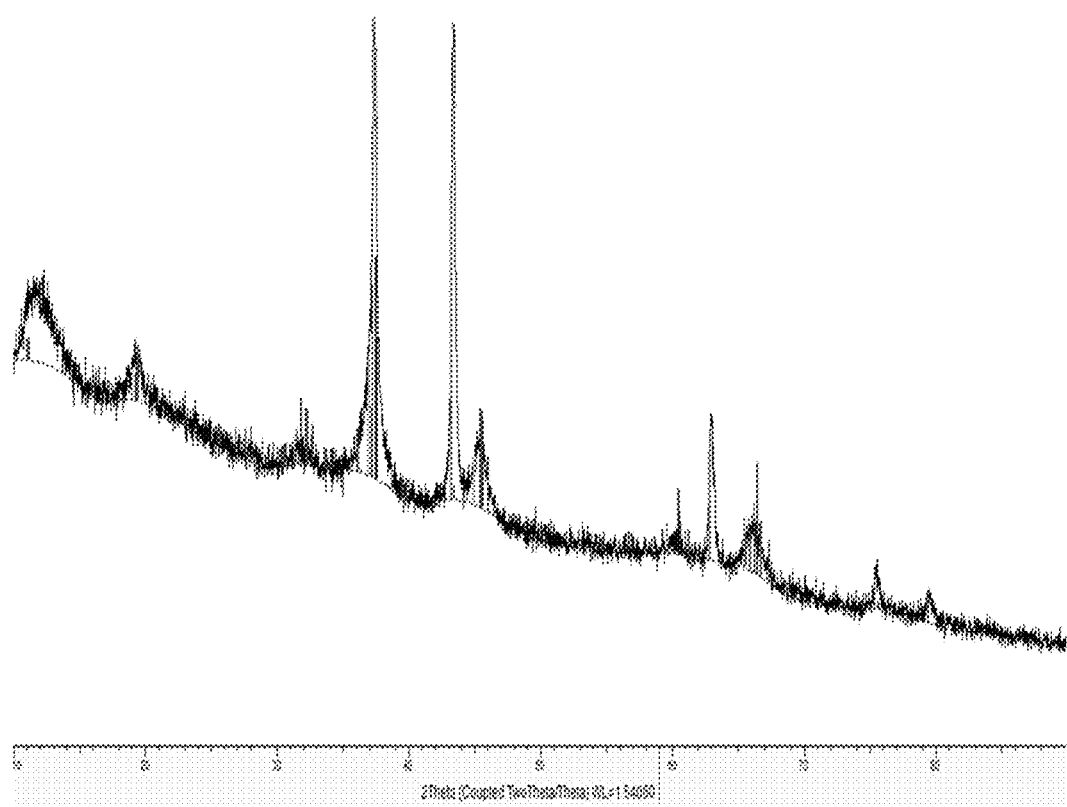
FIG. 4 is a plot of a wide angle X-ray diffraction (XRD) pattern of a further nickel based catalyst (catalyst 4) formed in accordance with an example embodiment of the present invention.

X-ray diffraction (XRD) analysis and BET surface area characterization was performed on the resultant catalyst structure and is described below with reference to FIG. 4 and Table 2. The resultant catalyst formed has an overall formula of $NiAl_{10}O_{16}$ with distinct crystalline phases, a majority of which is made up of nickel aluminum oxides having the formulas $NiAl_2O_4$ and $NiAl_{10}O_{16}$. However, as described in further detail herein, while not detected by XRD analysis (due to the small quantity within the catalyst structure), the catalyst structure also includes molybdenum.

The catalyst structures formed in Examples 1-4 and identified as Catalysts 1-4 were characterized using X-ray diffraction (XRD) analysis and X-ray fluorescence (XRF) analysis to determine the compositions, degree of crystallinity, phases (and % of each phase) and crystallite size for the various crystalline phases. The XRD characterization was performed using a Bruker D8 instrument with a CuKα radiation of 0.15406 nm at room temperature for 2θ ranges of 20.0° to 90° (wide angle) and 0.4° to 5.0° (small angle). Measurements were conducted using a voltage of 40 kV, current setting of 40 mA, step size of 0.02°, and count time of 4 s (wide angle) and 20 s (small angle). Microscope glass slides were used as sample supports for all samples. Principal XRD measurements were—Phase and % of each phase, % Crystalinity, Cystalite size. The wide angle XRD patterns of each of catalysts 1-4 are provided in the plots presented in FIGS. 1-4, respectively.

The XRD data was combined with the XRF data to determine actual compositions of crystalline phases in relation to expected or theoretical compositions. The results for each catalyst 1-4 are provided in Table 2:

TABLE 2

Compositions, Phases and Crystallite Sizes of Catalysts 1-4

| Catalyst | Overall Formula | Identified Phases, Percentage of each Phase and Crystallite Size (nm) | | | | | | | | Crystallinity % |
|---|---|---|---|---|---|---|---|---|---|---|
| | | | % | Size | % | Size | % | Size | % | Size | |
| Cat. 1 | $NiAl_2O_4$ | $NiAl_2O_4$ 95.73 | 29.2 | $NiO$ 4.27 | 43 | N/A | | N/A | | 34.8 |
| Cat. 2 | $NiAl_{10}O_{16}$ | $NiAl_{10}O_{16}$ 61.95 | 12.2 | $Al_2O_{3.52}$ 38.05 | 21.6 | N/A | | N/A | | 34.6 |
| Cat. 3 | $Ni_2Al_3O_5$ | $NiAl_2O_4$ 71.71 | 54.5 | $NiO$ 8.49 | 40.5 | Amorphous part 19.89 | | N/A | | 87.67 |
| Cat. 4 | $NiAl_{10}O_{16}$ | $NiAl_2O_4$ 12.51 | 114.1 | $NiO$ 14.75 | 266 | $NiAl_{10}O_{16}$ 40.19 | 217.5 | $Al_2O_{3.52}$ 32.55 | 0.3 | 78.26 |

It is noted that the XRD analysis for Catalyst 4 did not identify molybdenum as being present in this catalyst structure. This is due to the fact that the molybdenum content is very small within this catalyst structure (only about 10% of the content of nickel). Nevertheless, molybdenum is in fact present within one or more crystallites of catalyst 4.

The surface area of the catalysts was determined using the BET method and a Gemini VII 2390 surface area analyzer from Micrometrics Instruments. For each catalyst the surface area, pore volume and pore size were determined. The results are provided as follows in Table 3:

TABLE 3

BET Characterization of Catalysts 1-4

| Catalyst | Surface Area (m²/g) | Pore Volume (cm³/g) | Average Pore Size (Å) |
|---|---|---|---|
| Catalyst 1 | 24.2685 | 0.137731 | 227.012 |
| Catalyst 2 | 29.5111 | 0.134038 | 181.6778 |
| Catalyst 3 | 13.05 | 0.078 | 239.4 |
| Catalyst 4 | 60.61 | 0.21 | 13.62 |

As indicated by the data represented in FIGS. 1-4 and Tables 2 and 3, the nickel based catalyst structures of Examples 1-4 (also referenced as catalysts 1-4) are multicrystalline structures including one or more oxides comprising an alloy of nickel and aluminum which make up a majority (e.g., greater than 50% by weight) of the crystallites within the catalyst structures. For example, the nickel aluminum oxides forming one or more crystallites within each of the catalysts 1-4 comprise a majority (i.e., 50% or more) by weight of the catalyst structure. In particular, catalyst 1 comprises more than 90% by weight (in particular, at least about 95% by weight) of a nickel aluminum oxide ($NiAl_2O_4$), catalyst 2 comprises more than 60% by weight of a nickel aluminum oxide ($NiAl_{10}O_{16}$), catalyst 3 comprises more than 70% by weight of a nickel aluminum oxide ($NiAl_2O_4$), and catalyst 4 comprises more than 50% by weight of two nickel aluminum oxides ($NiAl_2O_4$ and $NiAl_{10}O_{16}$).

The catalysts 1-4 further are characterized having a large surface area of at least about 13 m²/g, where the surface areas of the structures formed range from about 13 m²/g to about 60 m²/g. As previously noted, these features of the catalyst structures are achieved based at least in part upon the extended drying time periods and calcination steps (e.g., providing a calcination process with stepped heating such as described in Table 1) used to form the catalyst structures.

The nickel based catalyst structures formed in accordance with the present invention provide a number of beneficial features when utilized in a reforming process, such as in hydrogen production processes achieved by seam reforming of hydrocarbons, in autothermal reforming for fuel cell applications, as part of a solid oxide fuel cell anode catalyst, and for syngas production and/or upgrading/cleanup operations for reforming of light hydrocarbons and tars as well as decomposition of ammonia. As described herein, the nickel based catalyst structures are highly resistant to high concentrations of sulfur (e.g., in the presence of $H_2S$ at a concentration significantly greater than about 35 ppm, such as at a concentration of about 90 ppm or greater, at a concentration of about 100 ppm or greater, or at concentrations of about 250 ppm or greater, and even concentrations as high as 500 ppm) and therefore are very effective for reforming operations in hydrocarbon gases that contain sulfur.

Catalysts 1-4 were subjected to a number of performance tests to determine effectiveness in reforming operations of hydrocarbon gases, where the reforming operations were conducted at high temperatures in the range of about 900° C. to about 1000° C., at pressures from about 15 PSIG to about 200 PSIG, and at varying concentrations (low and high) of sulfur present in the form of $H_2S$ within the hydrocarbon gases.

The tests were conducted using syngas feeds obtained from two types of reactors, a Kellogg, Brown and Root (KBR) Transport Reactor Integrated Gasifier (also referred to as TRIG) reactor, and a Lurgi Fixed-Bed Dry-Bottom Feed (FBDB) reactor. Both feeds included CO, $CO_2$, $H_2$, $CH_4$ and varying amounts of $H_2S$ (at concentrations of 35, 90, 250 and 500 ppm). Tars were also added (simulated as toluene) to the feeds by a syringe pump. In addition, ammonia was added by dissolving ammonium hydroxide in water and adding to the feeds with a pump. The feeds were delivered to a reforming reactor, where each feed had the compositions as set forth in Table 4:

TABLE 4

Compositions of Feeds Delivered to Reforming Reactor

| | $H_2$ | CO | $CO_2$ | $CH_4$ | $H_2O$ | $H_2S$ | $NH_3$ | Tar1 |
|---|---|---|---|---|---|---|---|---|
| TRIG - lignite | 29.2% | 34.3% | 13.6% | 2.5% | 18.9% | varies for different examples | .28% | .10% |
| Lurgi's FBDB - lignite | 18.7% | 7.5% | 15.7% | 5.2% | 51.6% | varies for different examples | .58% | .41% |

In the tests for each catalyst, the catalyst was loaded at the center of the reactor, and the remaining volume of the reactor was packed with crushed alpha alumina having a low surface area. A desired reaction temperature was maintained using a single point thermocouple at the center of the reactor. A heated static premixer was used prior to feed introduction to the reactor to achieve uniform gas feed composition. The exit gases were heated to reduce condensation on tubing walls and were further passed through a condenser to remove any water produced during the process. The remaining gases were analyzed using a multi detector gas chromatograph (SRI Instruments) equipped with one flame ionization detector (to determine toluene conversion), two thermal conductivity detectors (to determine CO and NH3 conversion) and one flame photometric detector (to detect sulfur).

During the reforming tests with catalysts 1-4, the following parameters within the reactor were also tested: temperature from 900° C. to 1000° C.; pressure from 15 PSIG to 100 PSIG; and space velocities from 6000 hr$^{-1}$ to 24000 hr$^{-1}$. The following examples are provided to demonstrate the effectiveness of the sulfur-resistant nickel based catalyst structures formed in accordance with the present invention when utilized in a reforming reactor to convert methane to hydrogen and one or more other components (e.g., carbon monoxide) and increase syngas yield.

Example 5—Verification of Catalyst Activity in Methane Conversion

Figure 5:
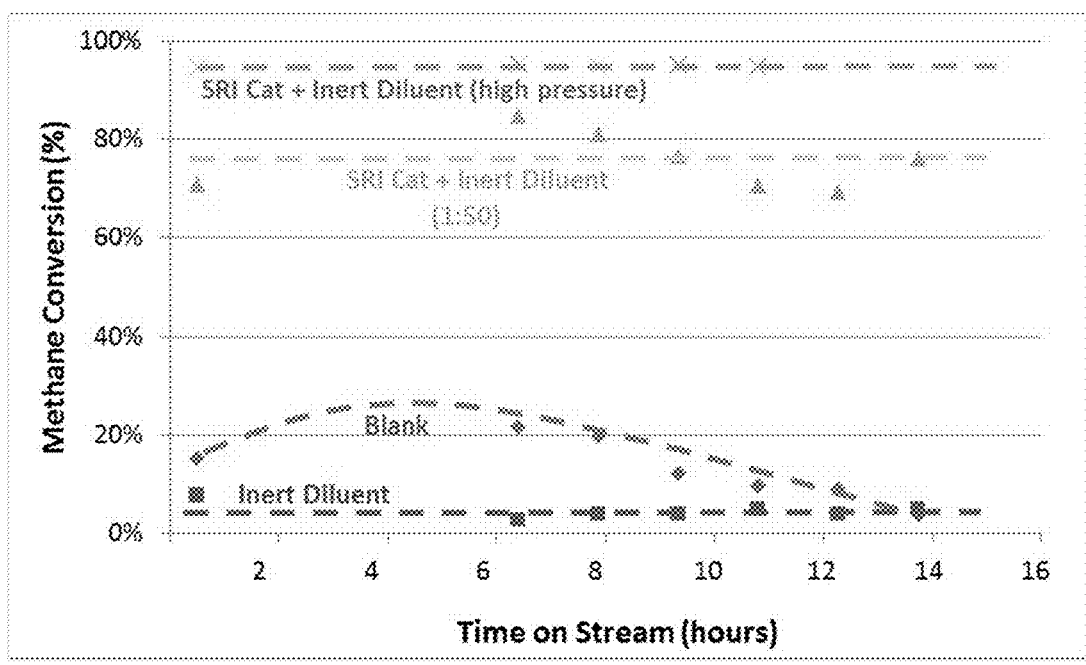
FIG. 5 is a plot demonstrating the effect of methane conversion within a reforming reactor with no catalyst added vs. a catalyst added that is formed in accordance with the present invention.

Initial tests were conducted within the reforming reactor to monitor the effect of the reactor walls (referenced as BLANK in the data plot of FIG. 5) and inert packing material (referenced as INERT DILUENT in the data plot of FIG. 5). The initial test results of methane conversion vs. time are plotted in FIG. 5, where it can be seen that, with no catalyst provided, the reactor walls and inert packing material have little to no effect on methane conversion over time. While low conversion was observed for the blank reactor initially (for about the first two hours), the activity subsequently diminished. In contrast, when a nickel based catalyst formed in accordance with the present invention (catalyst 1) was added to the reactor (operating condition at 100 PSIG), methane conversion was high and maintained with relatively no loss of activity for an extended period of time (8+ hours).

Figure 6:
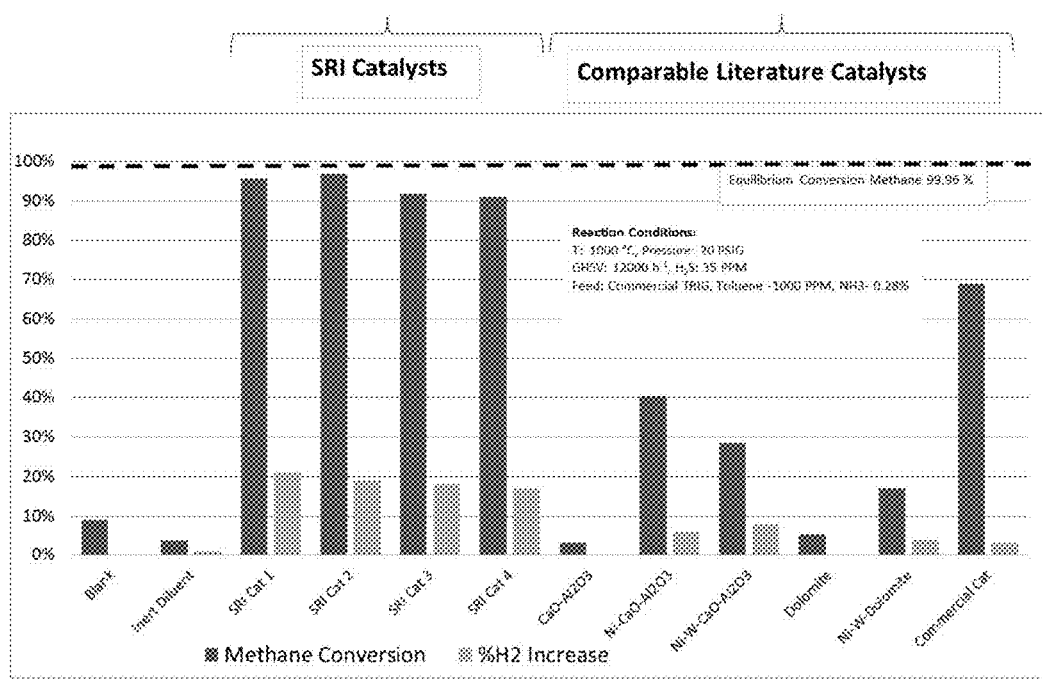
FIG. 6 is a plot showing TRIG feed test data results for methane conversion and % $H_2$ increase for the catalysts identified by the XRD pattern plots of FIGS. 1-4 as well in comparison with certain known catalysts.

Example 6—Comparison of Catalysts 1-4 with Known Catalysts for Syngas Processing In this example, the Catalysts 1-4 were compared against certain known catalysts to determine the effectiveness in conversion of methane and increase in $H_2$ (to increase $H_2$:CO ratio within syngas) in the reforming reactor under the same operating conditions and using the TRIG feed as set forth in Table 4. The known catalysts that were tested in this Example are as follows: $CaO-Al_2O_3$, $Ni-CaO-Al_2O_3$, $Ni-CaO-W-Al_2O_3$, dolomite ($CaMg(CO_3)_2$), Ni—W-dolomite, and a further commercial catalyst. All of the catalysts were tested within the reactor at the following conditions: temperature of 1000° C., pressure of 20 PSIG, and space velocity of 12000 $hr^{-1}$. In addition, the TRIG syngas feed had a $H_2S$ concentration of 35 ppm, a toluene concentration of 1000 ppm and an ammonia concentration of 0.28%. The test data results for the performance of each tested catalyst at these conditions and with this TRIG feed are plotted in FIG. 6. In particular, FIG. 6 depicts methane conversion (%) and $H_2$ increase (%) for each tested catalyst. As indicated by the data presented in FIG. 6, each of the catalysts 1-4 performed much better than the known catalysts in both methane conversion (90% or greater methane conversion for each of catalysts 1-4, whereas no known catalyst performed above 70% methane conversion) and $H_2$ increase (above 10% and some even at or above 20% $H_2$ increase for catalysts 1-4, whereas the none of the known catalysts performed above 10%).

Figure 7:
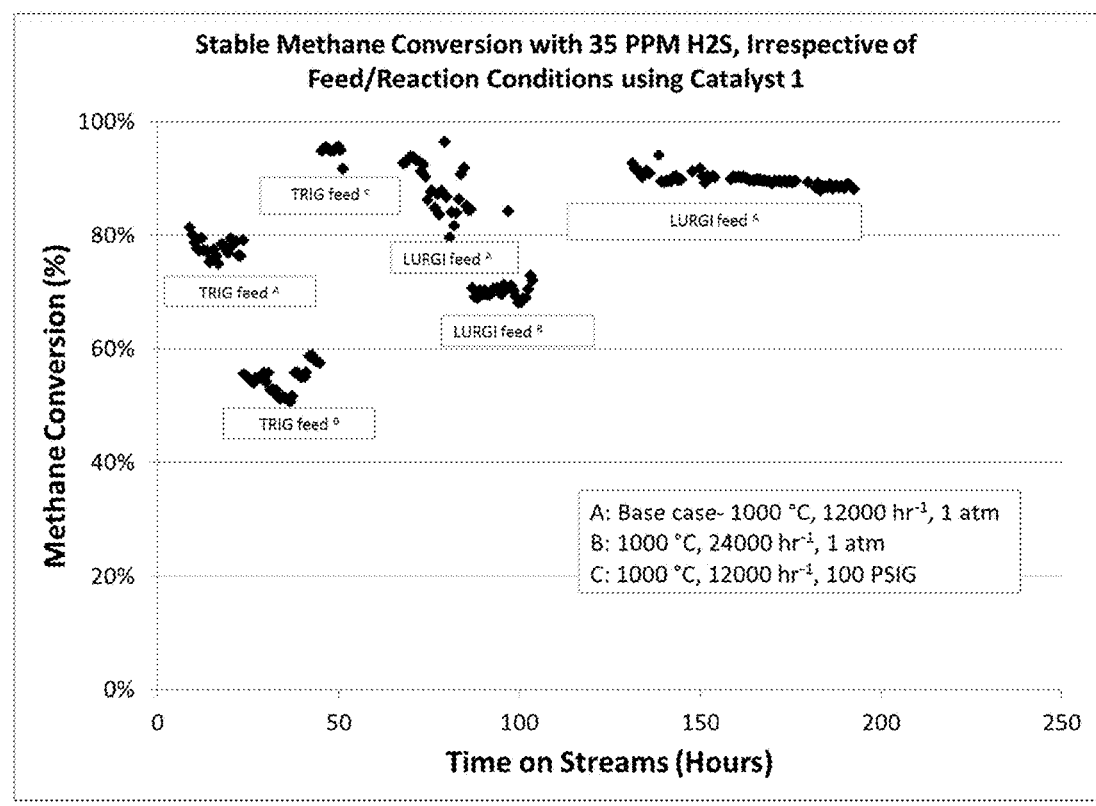
FIG. 7 is a plot showing stable methane conversions in both TRIG and LURGI feeds containing 35 ppm $H_2S$ at different pressures, space velocities and temperatures.

Example 7—Effect of Performance of Catalyst 1 Based Upon Changing Reactor Conditions In this example, catalyst 1 was tested within the reforming reactor using both the LURGI and TRIG feeds (having concentrations as set forth in Table 4) and at a low $H_2S$ concentration of 35 ppm, where the operating conditions (temperature, pressure and space velocity) were varied to determine the effect on methane conversion over an extended period of time (days). The data results are plotted in FIG. 7. The three operating conditions used for the test were: condition A at 1000° C., 1 atm and 12000 $hr^{-1}$; condition B at 1000° C., 1 atm and 24000 $hr^{-1}$; and condition C at 1000° C., 100 PSIG and 12000 $hr^{-1}$. The data indicates that catalyst performance was not substantially affected (with no sign of deactivation of the catalysts) due to changing operating conditions and over the extended periods of time.

Figure 8:
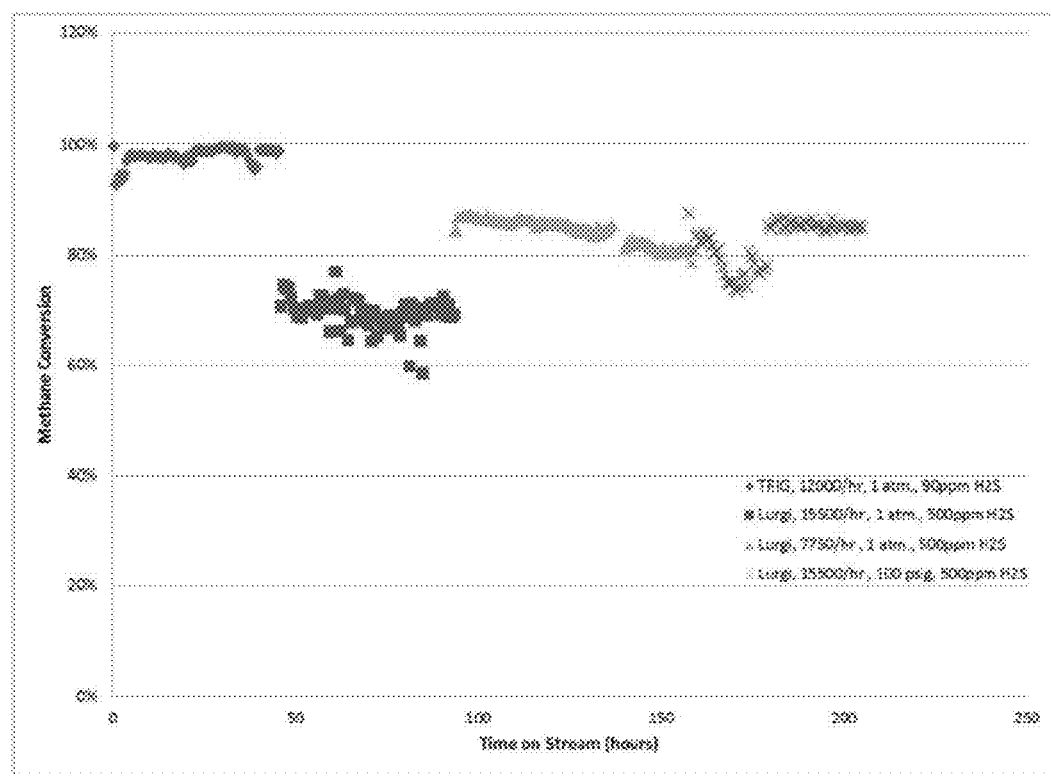
FIG. 8 is a plot showing stable methane conversions in both TRIG and LURGI feeds containing varying $H_2S$ concentrations and at different pressures and space velocities.

Example 8—Effect of Performance of Catalyst 2 Based Upon Changing Reactor Conditions and Change in Sulfur Concentration In this example, catalyst 2 was tested within the reforming reactor using both the LURGI and TRIG feeds (having concentrations as set forth in Table 4) and at varying concentrations of $H_2S$, where the operating conditions (pressure and space velocity) were also varied to determine the effect on methane conversion over an extended period of time (days). The data results are plotted in FIG. 8. The different operating conditions used for the test were: first condition at 1 atm and 12000 $hr^{-1}$ and an $H_2S$ concentration of 90 ppm (TRIG feed); second condition at 1 atm and 15500 $hr^{-1}$ and an $H_2S$ concentration of 500 ppm (LURGI feed); third condition at 1 atm and 7750 $hr^{-1}$ and an $H_2S$ concentration of 500 ppm (LURGI feed); and fourth condition at 100 psig and 15500 $hr^{-1}$ and an $H_2S$ concentration of 500 ppm (LURGI feed). The data indicates that catalyst performance was not significantly affected due to changing operating conditions, over the extended periods of time and also at the different $H_2S$ concentrations. While the performance (measured by methane conversion) was better at the lower $H_2S$ concentrations (e.g., nearly 100% conversion of methane at 90 ppm $H_2S$), even at 500 ppm $H_2S$ within the gas feed the methane conversion was about 60-85% over days (e.g., periods of about 100-200 hours).

Example 9—Effect of $H_2S$ Concentration on Methane Conversion and $H_2$ Increase by Catalyst 1

Figure 9:
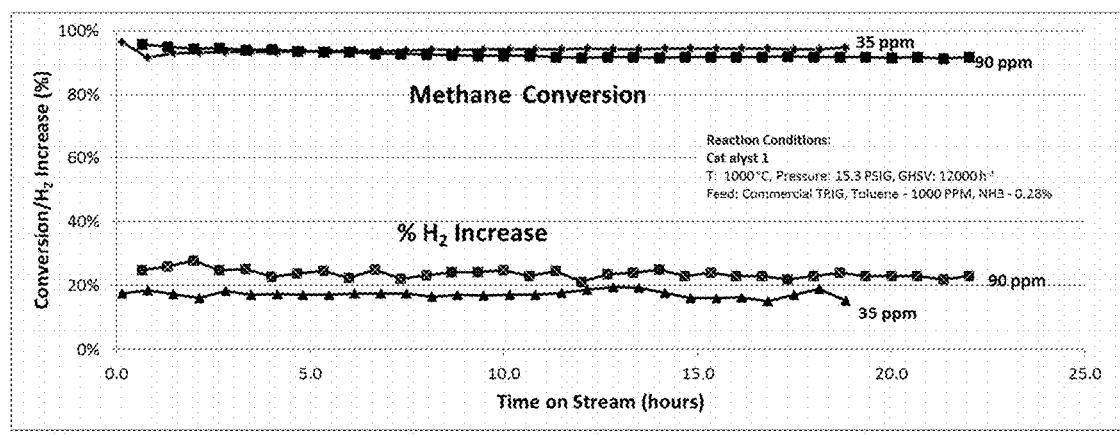
FIG. 9 is a plot showing the activity of the catalyst of FIG. 1 (catalyst 1) tested utilizing a TRIG feed at $H_2S$ concentrations of 35 and 90 ppm.

In this example, catalyst 1 was tested in the reforming reactor with operating conditions as follows: 1000° C., 15.3 PSIG and 12000 $hr^{-1}$. A TRIG feed having a composition as set forth in Table 4 (with toluene concentration of 1000 ppm and ammonia concentration of 0.28%) was provided with varying concentrations of sulfur. In particular, the TRIG feed was provided having $H_2S$ concentrations of 35 ppm and 90 ppm. Tests were conducted to determine methane conversion and $H_2$ increase within the TRIG feed over a period of 20+ hours. The test data is presented in the plot in FIG. 9. This data demonstrates that the change in $H_2S$ concentration from 35 ppm to 90 ppm has little or no effect on the performance of catalyst 1, with little or no deactivation of the catalyst by sulfur during the reforming process. In each test at the varying $H_2S$ concentrations, catalyst 1 performed well over the extended time period, with a 90+% conversion of methane and an $H_2$ increase within the TRIG feed of about 18-22%.

Example 10—Effect of $H_2S$ on Syngas Yield for Catalyst 2

Figure 10:
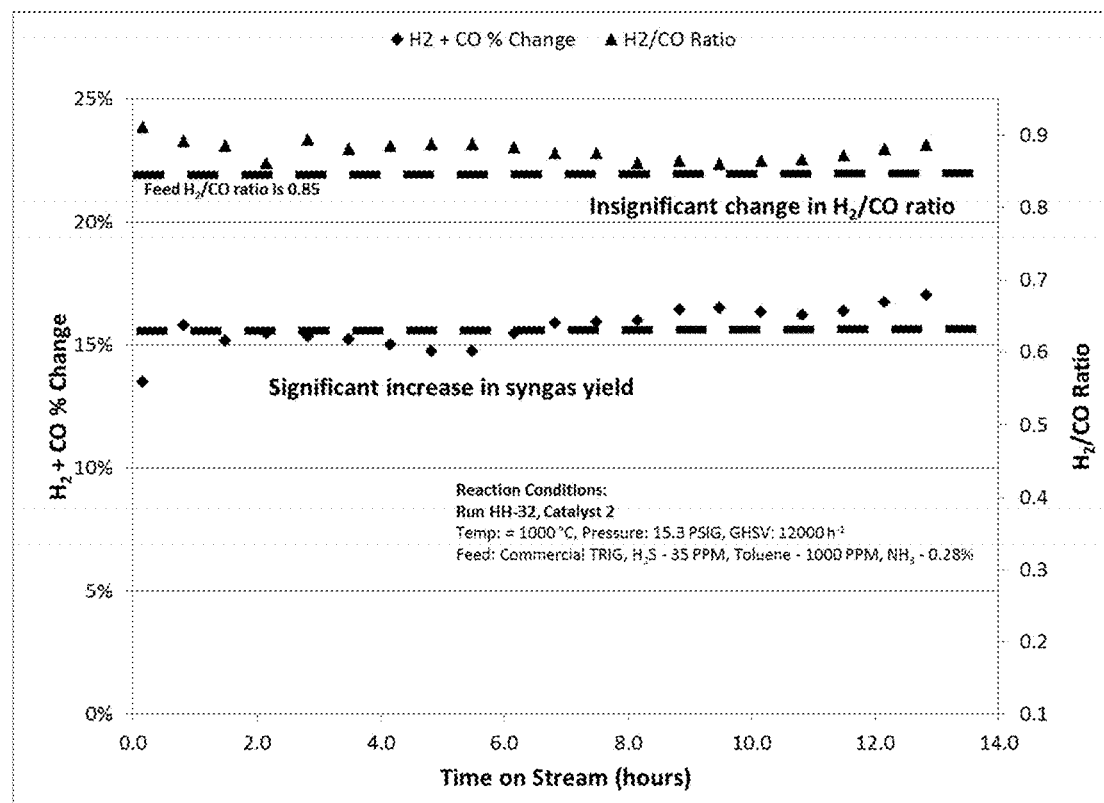
FIG. 10 is a plot showing significant increase in syngas yields for the catalyst of FIG. 2 (catalyst 2) with a TRIG feed containing 35 ppm $H_2S$.

In this example, catalyst 2 was tested in the reforming reactor using the same TRIG feed and same operating conditions as described for Example 9, with the $H_2S$ concentration in the TRIG feed being set at 35 ppm. The amount of syngas yield (measured in % change of $H_2$ and CO) was monitored along with the $H_2$:CO ratio over a period of about 14 hours. The test data is provided in the plot of FIG. 10. In particular, the data demonstrates the effectiveness in the performance of catalyst 2 in increasing syngas yield (due to high methane conversion within the reactor), which is maintained over the extended period of time despite the presence of sulfur within the feed. Thus, catalyst 2 also showed little or no deactivation by sulfur over the test period.

Figure 11:
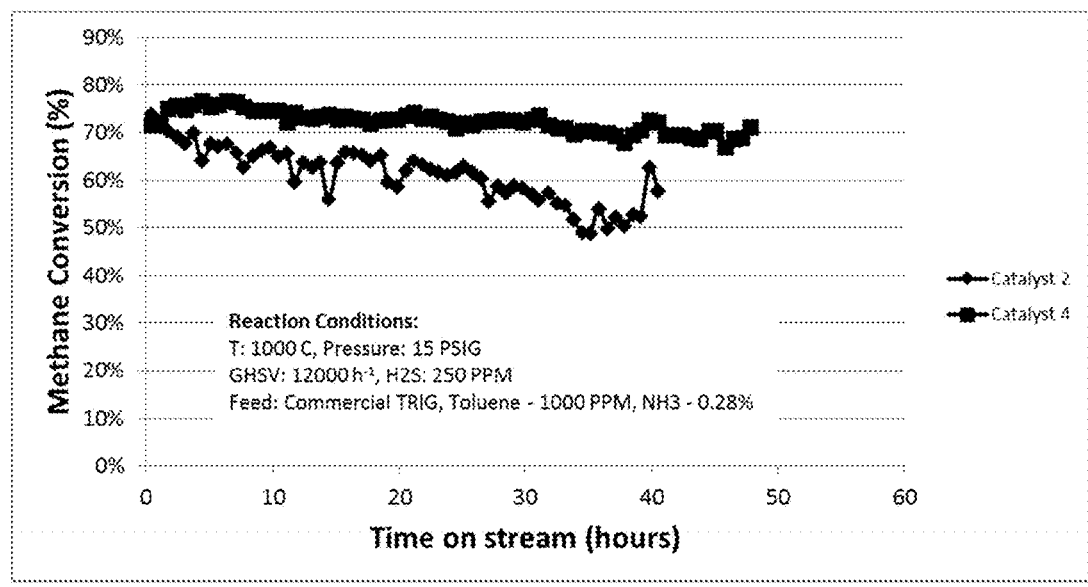
FIG. 11 is a plot showing stable catalyst performance (methane conversion) for a TRIG feed at an $H_2S$ concentration as great as 250 ppm for the catalysts of FIGS. 2 and 4 (catalysts 2 and 4).

Example 11—Effect on Performance of Catalysts 2 and 4 with $H_2S$ Concentration in Feed at 250 ppm Using TRIG Feed This example demonstrates the performance of catalysts 2 and 4 at higher sulfur concentrations. In particular, a TRIG feed having the composition as described in Table 4 was provided for this test (toluene concentration of 1000 ppm, ammonia concentration of 0.28%), where the Lurgi feed had a $H_2S$ concentration of 250 ppm and the reactor was operating with the following conditions: 1000° C., 15 PSIG and 12000 $hr^{-1}$. The test was conducted for an extended time period of over 40 hours. Methane conversion was monitored, and the test result data for both catalysts is plotted in FIG. 11. The test data demonstrates that both catalysts 2 and 4 provided a relatively constant and high methane conversion of about 70-80% over the extended time period and at the high sulfur concentration within the feed. Only a slight deactivation of the catalysts over the extended time period was exhibited after an extended time (e.g., at about 30 hours for catalyst 2, in which a decrease in methane conversion occurred). Thus, both catalysts demonstrated sulfur resistance at high $H_2S$ concentration and with little or no deactivation for an extended period of time.

Figure 12:
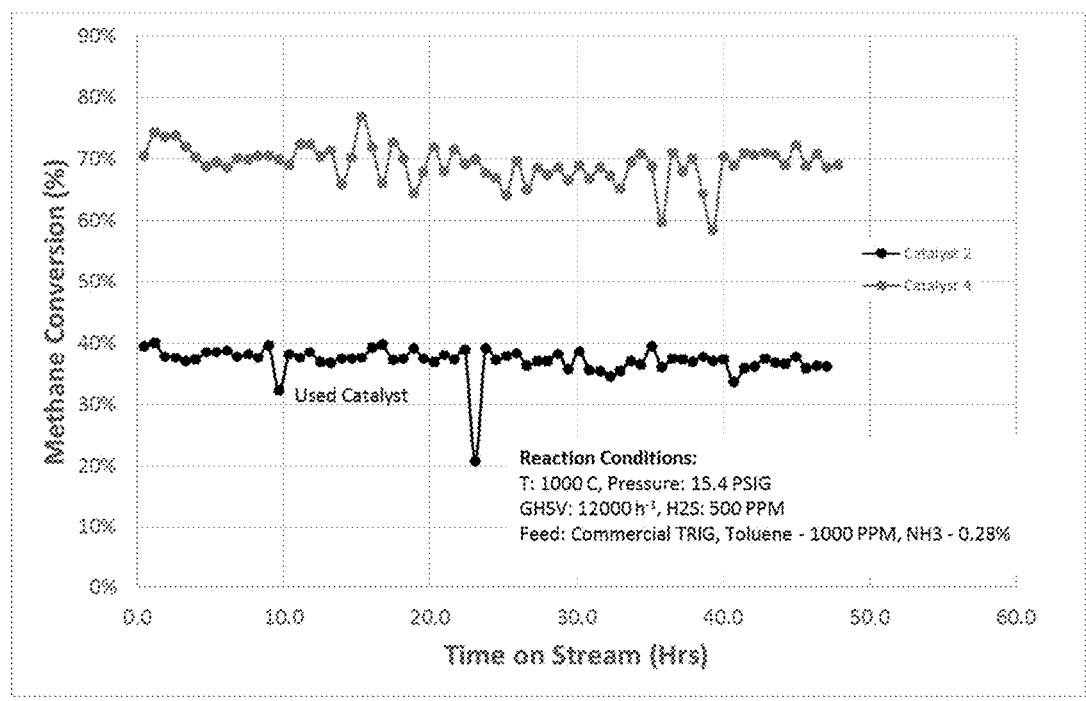
FIG. 12 is a plot showing stable catalyst performance (methane conversion) for a TRIG feed at an $H_2S$ concentration as great as 500 ppm for the catalysts of FIGS. 2 and 4 (catalysts 2 and 4).

Example 12—Effect on Performance of Catalysts 2 and 4 with $H_2S$ Concentration in Feed at 500 ppm Using TRIG Feed In this example, catalysts 2 and 4 were again tested under reactor conditions that were the same as those for Example 11 and with the same TRIG feed with the exception that the $H_2S$ concentration in the TRIG feed was increased to 500 ppm. The test was conducted for both catalysts over a period of 40+ hours, and methane conversion was monitored. The results of the test data are plotted in FIG. 12. The test data demonstrates the effective performance of both sulfur-resistant catalysts even at the higher $H_2S$ concentration of 500 ppm. In particular, the test data for catalyst 4 indicates a relatively constant methane conversion of 70+% over the extended time period, which is similar to the methane conversion for this same catalyst as exhibited in Example 11 (at the $H_2S$ concentration of 250 ppm). Both catalysts both catalysts demonstrated sulfur resistance at high $H_2S$ concentration (500 ppm) and with little or no deactivation for an extended period of time.

Figure 13:
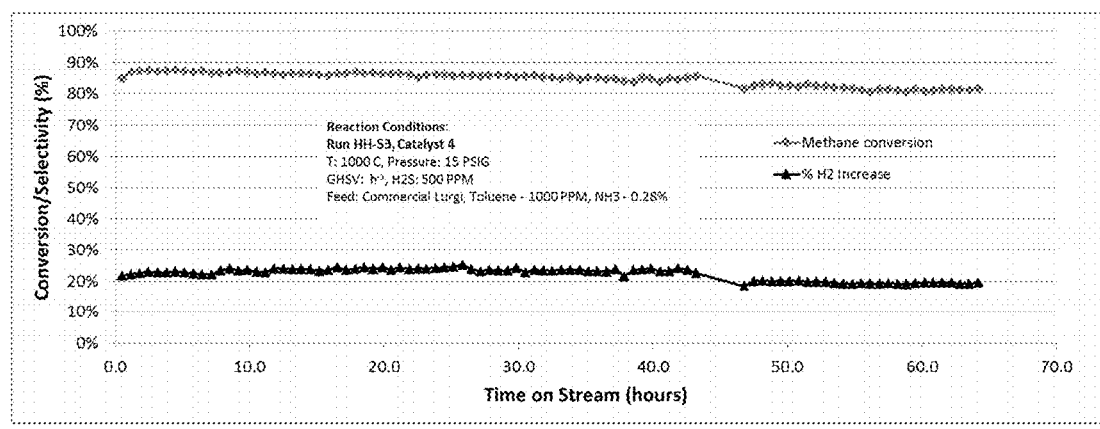
FIG. 13 is a plot showing the stability for a sustained time period (65 hours) of the catalyst of FIG. 4 (catalyst 4) for converting methane and increasing $H_2$ in the product stream of a LURGI feed.

Example 13—Effect on Performance of Catalyst 4 with $H_2S$ Concentration in Feed at 500 ppm Using Lurgi Feed In this example, catalyst 4 was tested utilizing the Lurgi feed as described in Table 4 (toluene concentration of 1000 ppm, ammonia concentration of 0.28%), where the Lurgi feed had a $H_2S$ concentration of 500 ppm. The operating conditions of the reforming reactor were as follows: 1000° C., 0.08 PSIG and 12000 $hr^{-1}$. Methane conversion and $H_2$ increase were monitored, and the test results are plotted in FIG. 13. Catalyst 4 performed well over the extended time period of 60+ hours, with a methane conversion maintained at between 80-90% and an $H_2$ increase maintained at or above 20% for the extended time period. Thus, catalyst 4 demonstrated sulfur resistance within the reformer, with little deactivation over the 60+ hour time period.

Thus, the various examples previously described herein demonstrate the effectiveness of the nickel based catalyst structures in reforming operations (conversion of methane and increase in $H_2$) within a syngas at varying concentrations of $H_2S$ present in the syngas, where the catalyst structures are effective for long periods of time (e.g., continuous operation within a reformer for about 8 hours or longer) in maintaining conversion of methane at $H_2S$ concentrations greater than about 35 ppm. In particular, the catalyst structures are effective at $H_2S$ concentrations greater than about 90 ppm (e.g., at $H_2S$ concentrations of about 100 ppm or greater, at $H_2S$ concentrations of about 250 ppm or greater, and even at $H_2S$ concentrations as high as about 500 ppm). In certain performance tests, the catalyst structures showed relatively no reduction in activity (based upon the conversion of methane and/or production of $H_2$ within the reformer being maintained relatively constant) for over 200 hours at $H_2S$ concentrations of 35 ppm; the catalyst structures showed relatively no reduction in activity for at least 50 hours at $H_2S$ concentrations of 90 ppm; and the catalyst structures showed sufficient tolerance to $H_2S$ concentrations of up to 500 ppm. The performance data further showed that the catalyst structures convert a much greater percentage of methane in a syngas feed at $H_2S$ concentrations of about 35 ppm and greater in relation to conventional catalysts (e.g., conversions of at least about 80% of methane in a syngas feed having $H_2S$ concentration of 35 ppm).

The methods of preparing the catalyst structures (with extended drying times and particular calcination steps) result in the formation of catalyst structures with high crystallinity (e.g., greater than 30%, greater than 50%, or even greater than 75%) and with distinct crystalline phases formed by different oxides that include one or both nickel and aluminum, where a majority (e.g., greater than 50% by weight) of the catalyst structure comprises one or more nickel aluminum oxides. In particular, the methods of preparation facilitate the forming of one or more nickel aluminum oxide phases, such as $NiAl_2O_4$ and $NiAl_{10}O_{16}$, that facilitate high resistance to high sulfur concentrations (due to the aluminum presence protecting nickel from attack and reduction by sulfur). Further, the formation of catalyst structures that include one or more nickel aluminum oxide phases, such as $NiAl_2O_4$, $NiAl_{10}O_{16}$, and also a NiO phase (e.g., catalyst 4) are also highly effective in being resistant to sulfur.

The long and slow drying portion of the formation process in combination with the calcination (stepped heating) process also results in the formation of mesoporous catalyst structures with large surface areas that are as much as two times greater in relation to conventional nickel based catalysts and having pore sizes (e.g., diameters) in the range of about 2 nm to about 25 nm or greater. This increases the area for active sites for hydrocarbon conversion as well as protection of nickel by aluminum from attack by sulfur in the structures.

The effectiveness of each nickel oxide phase within the catalyst structure can be prioritized for resistance to sulfur as follows (from greatest or most effective in providing sulfur resistance to least effective): $NiAl_{10}O_{16}$>$NiAl_2O_4$>NiO. In other words, the nickel aluminum oxide phases are more effective for providing sulfur resistance in relation to NO, where the nickel aluminum oxides having a greater molar amount of aluminum are further more effective in resistance to sulfur than other nickel aluminum oxides having a smaller molar amount of aluminum. Thus, catalysts having a significant nickel aluminum oxide phase of $NiAl_{10}O_{16}$ and/or $NiAl_2O_4$ have been found to provide exceptional resistance to deactivation for long periods of time (e.g., being subjected to high sulfur concentrations for about 8 hours or longer) in reforming operations having $H_2S$ concentrations of greater than about 35 ppm (e.g., $H_2S$ concentrations of about 90 ppm or greater, or at about 100 ppm or greater). For example, catalyst 1 includes $NiAl_2O_4$ at about 95% to about 97% by weight and NiO at about 3% to about 5% by weight.

Catalyst 3 includes $NiAl_2O_4$ at about 71% to about 73% by weight and NiO at about 7% to about 9% by weight. Catalyst 2 includes $NiAl_{10}O_{16}$ at about 61% to about 63% by weight, with $Al_3O_{3.52}$ provided in an amount of about 37% to about 39% by weight. The $Al_3O_{3.52}$ phase acts as a stabilizer for the catalyst. Catalyst 4 includes $NiAl_{10}O_{16}$ at about 39% to about 41% by weight, $NiAl_2O_4$ at about 12% to about 13% by weight, NiO at about 14% to about 16% by weight, and $Al_3O_{3.52}$ (acts as stabilizer in catalyst 4) provided in an amount of about 32% to about 33% by weight.

Further, the addition of molybdenum (even in small amounts) has been found to increase the sulfur resistance of the catalyst structures. For example, catalyst 4 includes small amounts of molybdenum, no more than about 10% by weight of nickel content within the catalyst structure and/or no more than about 1% by weight of the catalyst structure, and this has found to enhance the catalyst structure in conversion of methane in a reformer at concentrations of sulfur of about 35 ppm or greater (e.g., concentrations of about 90 ppm or greater, or at about 100 ppm or greater). and for extended time periods (operation periods of about 8 hours or longer).

The sulfur resistant nickel based catalyst structures described herein are particularly useful in reforming processes, such as steam methane reforming (SMR), for implementation with a variety of coal and biomass gasification systems to increase syngas yield and improve $H_2$:CO ratios. Steam methane reforming is a useful method for hydrogen production and can be implemented, e.g., in a coal or biomass gasification process to convert light hydrocarbons (methane, ethane, propane, etc.) and tars formed from the gasifier, as well as ammonia and other components, into hydrogen and/or carbon monoxide. However, due to the presence of sulfur within the gas formed and its detrimental effect on poisoning and deactivation of the catalyst (e.g., nickel catalyst) within the reformer, most processes implementing a reformer must desulfurize the gas before it is delivered to the reformer (e.g., to reduce the $H_2S$ concentration within the gas to significantly less than 100 ppm). The present invention facilitates implementation of steam reformer including the sulfur resistant nickel based catalysts described herein for implementation in a coal or biomass gasification system at a location directly or nearly directly downstream from the gasifier and without the requirement of reducing the sulfur concentration significantly from the gas stream prior to entering the reformer. The reforming process utilizing the catalysts described herein facilitates near equilibrium conversion of methane in the presence of high sulfur concentrations (e.g., greater than about 35 ppm $H_2S$, such as at about 90 ppm or greater, at about 100 ppm or greater, at concentrations of $H_2S$ of greater than about 250 ppm or even as high as about 500 ppm) for extended periods of time of operation (e.g., continuous operation) of the reformer (e.g., periods of operation of about 8 hours or greater) within the coal or biomass gasification system. Further, under the same conditions, the reformer with the catalyst structures as described herein can yield about 100% conversion of tars and about 100% decomposition of ammonia into nitrogen and hydrogen, which are also important features of syngas cleanup operations. Further still, the reformer can provide light hydrocarbon (e.g., methane), tar and ammonia conversion within a single step (within the steam reformer) thus reducing the complexity of the syngas cleanup operations.

An example embodiment of a coal gasification system in accordance with the present invention is now described with reference to FIG. 14. In particular, the coal gasification system is a CTL (coal to liquids) gasification system that implements a steam reformer placed directly downstream from a coal gasifier, where the steam reformer utilizes one or more sulfur resistant nickel based catalyst structures as described herein.

Figure 14:
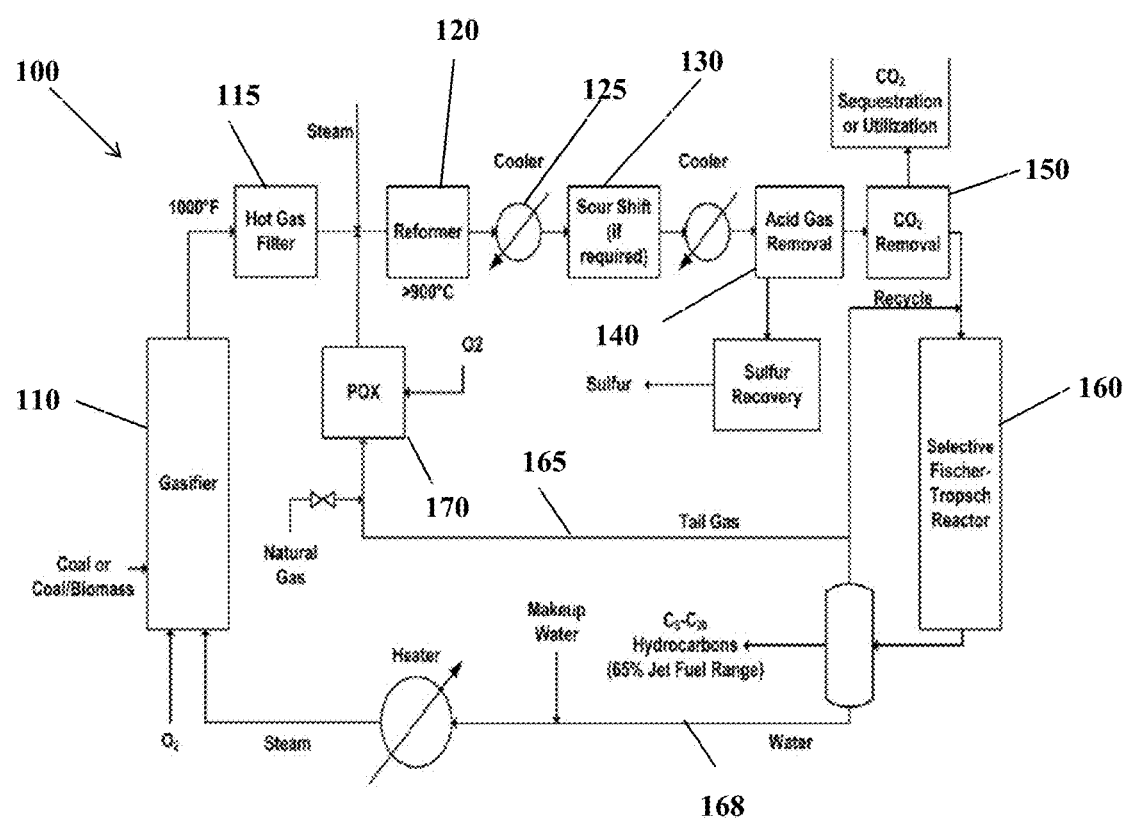
FIG. 14 is a schematic diagram of an example embodiment of a coal gasification system (a coal to liquids or CTL system) implementing a reformer that utilizes one or more catalysts in accordance with the present invention.

Referring to FIG. 14, the system 100 includes a coal gasifier 110 that receives a solid input of coal or a biomass as well as oxygen or air along with steam and gasifies the solids at suitable temperatures and pressures within the gasifier. An example gasifier 110 that can be utilized is a Transport Reactor Integrated Gasifier (TRIG), based upon gasification technology developed by KBR, Inc. and which produces a TRIG gas feed that can have components similar to those as described herein in relation to Table 4 as well as the examples showing performance of the catalysts 1-4. Another example gasifier 110 that can be utilized is a Lurgi Fixed-Bed Dry-Bottom Feed (FBDB) reactor that is based upon gasification technology provided by Air Liquide and produces a Lurgi gas feed that can have components similar to those as described herein in relation to Table 4 as well as the examples showing performance of the catalysts 1-4.

The exit gas from the gasifier 110 is fed to a hot gas filter 115 and then to the steam reformer 120 where it enters the reformer at temperatures of at least about 900° C. The filter 115 can selectively remove particulate matter within the gas stream of various sizes. The steam reformer 120 includes one or more of the sulfur resistant nickel based catalyst structures as previously described herein and is operable to convert methane and other light hydrocarbons, tars and ammonia from the input gas into hydrogen, nitrogen and carbon monoxide. The reformer 120 includes support structure within the housing of the reformer that supports the one or more catalyst structures disposed therein and further includes at least one inlet to receive the gas from the gasifier 110, steam and/or any other gaseous stream (e.g., processed tail gas 165 from a FT reactor 160 as described herein). The reformer is further configured with a sufficient volume to accommodate suitable space velocities of gases flowing through reformer as well as being sufficiently rated for operation at high temperatures (e.g., at temperatures of about 900° C. or greater, such as at temperatures of about 1000° C. or greater). Since the reformer 120 is directly downstream from the gasifier 110 (with only a filter 115 there between), the reformer 120 receives the input gas without any prior removal of $H_2S$ or any other gasified sulfur components that are present within the gas stream, where such sulfur components can be present in concentrations well above 35 ppm (e.g., at concentrations of about 90 ppm or greater, at concentrations of about 100 ppm or greater, at concentrations above about 250 ppm or even as high as about 500 ppm). The reformer 120 (with the one or more catalyst structures disposed therein) converts light hydrocarbons (e.g., methane), tars and ammonia into their various subcomponents to increase the hydrogen concentration in the gas.

The processed gas exits the reformer 120, and the exit gas is cooled to a suitable temperature below 900° C. via any one or more suitable heat exchangers 125. The cooled gas can optionally be processed via a conventional or any other suitable sour water gas shift (WGS) reactor 130 to convert water and carbon monoxide to hydrogen and carbon dioxide (so as to adjust the $H_2$:CO ratio within the syngas as desired). Acid gas removal (e.g., $H_2S$) from the cooled gas can be performed at a gas recovery unit 140 (which can further include sulfur recovery processing) which is downstream from the reformer 120 in system 100. A carbon dioxide removal (CDR) unit 150 is also located downstream from the reformer 120, where the CDR unit 150 removes selected amounts of carbon dioxide from the gas stream utilizing any conventional or other suitable technologies.

The gas processed by the reformer 120 (with further subsequent processing as depicted in FIG. 14) is fed to a reactor that converts the treated syngas into suitable hydrocarbons for fuel, such as liquid hydrocarbons. In the CTL system 100, the syngas formed by the gasifier, which has been treated by at least the reformer 120 to increase $H_2$ concentration within the gas as well as adjust the $H_2$:CO ratio to a suitable level, is provided to a Fischer-Tropsch (FT) reactor 160 for conversion of the syngas into liquid hydrocarbons. The FT reactor 160 processes the input syngas according to a conventional Fischer-Tropsch process, in which the syngas is converted (via a series of chemical reactions) into a variety of liquid hydrocarbons (e.g., $C_5$ to $C_{20}$ hydrocarbons) suitable for use as a fuel source for a variety of different technologies. A portion of the exit or tail gas 165 from the FT reactor 160 can be recycled for input to the reformer 120 (e.g., by first being processed in a partial oxidation reactor 170 to oxidize certain hydrocarbons in the tail gas), which enhances the energy efficiency of system 100. Further, water that is separated from the liquid hydrocarbons formed by the FT reactor 160 can be recycled and converted to steam for input to the gasifier 110.

Implementation of a reformer with one or more catalysts as described herein in a coal or biomass gasification system (such as the system 100 described herein) facilitates the conversion of light hydrocarbons such as methane, tars and ammonia within the syngas in a single processing step and at high temperatures (e.g., 900° C. and greater) and high sulfur concentrations (e.g., greater than about 35 ppm $H_2S$). The gasification system can further be continuously operated for extended periods of time (e.g., for periods of 8 hours or more) without deactivation of the catalyst within the reformer despite being exposed to high sulfur concentrations. Further, depending upon the $H_2$:CO ratios that can be obtained within the reformer utilizing the catalysts of the invention, a further WGS (water gas shift) step may minimized or even eliminated from the system.

Thus, the sulfur resistant nickel based catalyst structures described herein are highly effective in reforming operations for gases for conversion of different hydrocarbon components and ammonia to $H_2$, CO and $N_2$. Reforming operations including such catalyst structures are particularly effective in carbon or biomass gasification processes for cleanup operations of syngas and providing desirable $H_2$:CO ratios for further processing to form certain $C_5$ to $C_{20}$ hydrocarbon fuels.

While the invention has been described in detail and with reference to specific embodiments thereof, it will be apparent to one skilled in the art that various changes and modifications can be made therein without departing from the spirit and scope thereof.

Thus, it is intended that the present invention covers the modifications and variations of this invention provided they come within the scope of the appended claims and their equivalents.

What is claimed:

1. A catalyst structure comprising a plurality of metal oxides formed as crystallites within the catalyst structure, each metal oxide comprising nickel or aluminum, wherein one or more metal oxides comprises a nickel aluminum oxide, the one or more nickel aluminum oxides is greater than 50% by weight of the crystallites within the catalyst structure, the catalyst structure has a surface area of at least 13 m²/g, and one of the metal oxides defining the crystallites comprises $Al_3O_{3.52}$.

2. The catalyst structure of claim 1, wherein at least one metal oxide of the plurality of metal oxides formed as crystallites includes molybdenum.

3. The catalyst structure of claim 1, wherein the metal oxides formed as crystallites comprise $NiAl_2O_4$ and $Al_3O_{3.52}$.

4. The catalyst structure of claim 1, where the metal oxides formed as crystallites comprise $NiAl_2O_4$, NiO, $NiAl_{10}O_{16}$ and $Al_3O_{3.52}$.

5. The catalyst structure of claim 1, wherein the metal oxides formed as crystallites comprise $NiAl_2O_4$ and $NiAl_{10}O_{16}$.

6. The catalyst structure of claim 5, wherein at least one metal oxide of the plurality of metal oxides formed as crystallites includes molybdenum.

7. The catalyst structure of claim 5, wherein the catalyst structure includes a greater amount by weight of $NiAl_{10}O_{16}$ than $NiAl_2O_4$.

8. The catalyst structure of claim 5, wherein at least one metal oxide of the plurality of metal oxides formed as crystallites comprises NiO.

9. The catalyst structure of claim 1, wherein the catalyst structure is operable to convert at least about 80% of methane present within a syngas to hydrogen and one or more other components when the syngas is flowed through a steam reformer that includes the catalyst structure, the syngas including at least about 35 ppm $H_2S$.

10. The catalyst structure of claim 9, wherein the catalyst structure is further operable to maintain a substantially constant % conversion of methane within the syngas to hydrogen and one or more other components for a period of at least about 8 hours when the syngas includes $H_2S$ at a concentration of greater than about 35 ppm.

11. The catalyst structure of claim 1, wherein the catalyst structure consists essentially of 5-50 mol % nickel, 10-50 mol % aluminum, 0-5 mol % molybdenum, and 25-75 mol % oxygen.

12. A system for conversion of one or more hydrocarbon species in a gas, the system comprising:
a reformer including one or more catalysts disposed within the reformer, the one or more catalysts including the catalyst structure of claim 1, wherein the reformer is configured to receive an input gas stream comprising methane and $H_2S$ at a concentration of at least about 35 ppm and convert the input gas stream to form an output gas stream such that 70% of the methane present in the input gas stream is converted in the output gas stream to hydrogen and one or more other components.

13. The system of claim 12, wherein the reformer is configured to provide a constant conversion of methane to hydrogen and one or more other components within the output gas stream for a period of at least about 8 days and at a concentration of $H_2S$ of at least about 35 ppm.

14. The system of claim 12, further comprising:
a gasifier located upstream from the reformer, wherein the gasifier is configured to convert a solid material comprising one or more hydrocarbons into the gas stream to form the input gas stream for the reformer.

15. The system of claim 14, further comprising:
A Fischer-Tropsch reactor located downstream from the reformer to receive the output gas stream and form liquid hydrocarbons from the output gas stream.

16. A method of converting one or more hydrocarbon species including methane in a gas that also includes $H_2S$ at a concentration of at least about 35 ppm, the method comprising:

directing an input gas stream comprising the gas into an inlet of a reformer that includes one or more catalysts including the catalyst structure of claim 1; and converting the gas within the reformer to produce an output gas stream in which at least about 70% of methane present in the input gas stream is converted in the output gas stream to hydrogen and one or more other components.

17. The method of claim 16, wherein the gas includes $H_2S$ at a concentration of at least about 90 ppm.

18. The method of claim 16, wherein the converting the gas within the reformer is conducted at a temperature of about 1000° C. or greater.

* * * * *